US012718531B2

(12) United States Patent
Andersen et al.

(10) Patent No.: US 12,718,531 B2
(45) Date of Patent: Aug. 25, 2026

(54) SYSTEMS AND METHODS FOR COLLABORATIVE TRAINING OF A MACHINE LEARNING MODEL FOR POSE ESTIMATION

(71) Applicant: ProTrainings, LLC, Ada, MI (US)

(72) Inventors: Scott Christopher Andersen, Lowell, MI (US); Adam Matthew Fox, Grand Rapids, MI (US); Jason Edwin Leighton, Portland, OR (US)

(73) Assignee: ProTrainings, LLC, Ada, MI (US)

( * ) Notice: Subject to any disclaimer, the term of this patent is extended or adjusted under 35 U.S.C. 154(b) by 285 days.

(21) Appl. No.: 18/667,404

(22) Filed: May 17, 2024

(65) Prior Publication Data

US 2025/0356634 A1 Nov. 20, 2025

(51) Int. Cl.
*G06K 9/00* (2022.01)
*G06N 20/20* (2019.01)
(Continued)

(52) U.S. Cl.
CPC ........... *G06V 10/774* (2022.01); *G06N 20/20* (2019.01); *G06T 7/70* (2017.01); *G06V 10/82* (2022.01);
(Continued)

(58) Field of Classification Search
CPC ...... G06V 10/774; G06V 10/82; G06V 40/20; G06N 20/20; G06N 3/08; G06T 7/70;
(Continued)

(56) References Cited

U.S. PATENT DOCUMENTS 8,351,646 B2 * 1/2013 Fujimura .................. G06T 7/75
382/103
11,830,218 B2 * 11/2023 Alcantarilla ............. G06T 7/73
(Continued)

FOREIGN PATENT DOCUMENTS

WO 2020161118 A1 8/2020
WO WO-2020208359 A1 * 10/2020 ............ G06V 40/28
WO 2022241877 A1 11/2022

OTHER PUBLICATIONS

A Self-supervised Learning System for Object Detection using Physics Simulation and Multi-view Pose Estimation, Chaitanya Mitash et al., IEEE, 2017, pp. 545-551 (Year: 2017).*
(Continued)

*Primary Examiner* — Jayesh A Patel
(74) *Attorney, Agent, or Firm* — Caldwell LLC

(57) ABSTRACT

Described herein is a system and a method for collaborative training of a machine learning model for pose estimation. The system includes a remote computing device in communication with a local computing device, wherein the remote computing device is configured to instruct the local computing device to receive a first image; and generate a first pose datum as a function of the first image using a local machine learning model. The remote computing device is configured to receive, from the local computing device, the first pose datum; generate a second pose datum as a function of the first pose datum and the first image using a remote machine learning model; and configure the local computing device to retrain the local machine learning model as a function of the second pose datum.

20 Claims, 6 Drawing Sheets

(51) Int. Cl.
*G06T 7/70* (2017.01)
*G06V 10/774* (2022.01)
*G06V 10/82* (2022.01)
*G06V 40/20* (2022.01)

(52) U.S. Cl.
CPC .... *G06V 40/20* (2022.01); *G06T 2207/20081* (2013.01); *G06T 2207/20084* (2013.01); *G06T 2207/30196* (2013.01)

(58) Field of Classification Search
CPC . G06T 2207/20081; G06T 2207/20084; G06T 2207/30196
See application file for complete search history.

(56) References Cited

U.S. PATENT DOCUMENTS

| | | | | |
|---|---|---|---|---|
| 11,842,517 | B2 | 12/2023 | Lyons | |
| 2017/0168586 | A1* | 6/2017 | Sinha | G06N 20/00 |
| 2020/0074165 | A1* | 3/2020 | Ghafoor | G06V 40/103 |
| 2020/0090002 | A1* | 3/2020 | Zhu | G06F 18/253 |
| 2020/0090408 | A1* | 3/2020 | Virkar | G06T 15/04 |
| 2020/0320347 | A1* | 10/2020 | Nikolenko | G06N 3/047 |
| 2020/0327418 | A1* | 10/2020 | Lyons | G06V 40/28 |
| 2021/0118166 | A1* | 4/2021 | Tremblay | G06T 7/70 |
| 2021/0295166 | A1* | 9/2021 | Rouhani | G06N 3/0464 |
| 2022/0374773 | A1* | 11/2022 | Holste | G06F 11/3457 |
| 2022/0383069 | A1* | 12/2022 | Dai | G06N 3/044 |
| 2023/0401382 | A1* | 12/2023 | Hombaiah | G06N 3/088 |
| 2024/0005198 | A1* | 1/2024 | Lackey | G06N 20/00 |
| 2026/0011126 | A1* | 1/2026 | Zangenehpour | G06V 10/7747 |

OTHER PUBLICATIONS

M Specht et al; Detecting Mistakes in CPR Training with Multimodal Data and Neural Networks; Sensors (Basel). Jul. 2019; 19(14): 3099.

H Xie et al; A novel algorithm of fast CPR quality evaluation based on kinect; Journal of Algorithms & Computational Technology, First published online Dec. 29, 2020.

E Hu et al; LoRA: Low-Rank Adaptation of Large Language Models; Oct. 16, 2021; https://arxiv.org/abs/2106.09685.

Pose detection; https://developers.google.com/ml-kit/vision/pose-detection; retrieved Apr. 1, 2024.

N Houlsby et al; Parameter-Efficient Transfer Learning for NLP; Jun. 13, 2019; https://arxiv.org/abs/1902.00751.

* cited by examiner

SYSTEMS AND METHODS FOR COLLABORATIVE TRAINING OF A MACHINE LEARNING MODEL FOR POSE ESTIMATION

FIELD OF THE INVENTION

The present invention generally relates to the field of pose estimation and machine learning model training. In particular, the present invention is directed to systems and methods for collaborative training of a machine learning model for pose estimation.

BACKGROUND

Gathering high quality training data is often a substantial hurdle in training machine learning models. Additionally, certain neural networks have very large numbers of parameters, increasing the processing power and memory necessary to train or run the model.

SUMMARY OF THE DISCLOSURE

In an aspect, a system for collaborative training of a machine learning model for pose estimation may include a local computing device, wherein the local computing device is configured to receive a first image; and generate a first pose datum as a function of the first image using a local machine learning model; and a remote computing device in communication with the local computing device, wherein the remote computing device is configured to receive, from the local computing device, the first pose datum; generate a second pose datum as a function of the first pose datum and the first image using a remote machine learning model; and configure the local computing device to retrain the local machine learning model as a function of the second pose datum.

In another aspect, a method of collaborative training of a machine learning model for pose estimation may include, using a local computing device, receiving a first image, using the local computing device, generating a first pose datum as a function of the first image using a local machine learning model; and using a remote computing device in communication with the local computing device, receiving, from the local computing device, the first pose datum; using the remote computing device, generating a second pose datum as a function of the first pose datum and the first image using a remote machine learning model; and using the remote computing device, configuring the local computing device to retrain the local machine learning model as a function of the second pose datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for collaborative training of a machine learning model for pose estimation. In some embodiments, a local computing device associated with a camera may use the camera to capture a first image of a user. This image may be transmitted to a remote computing device which may use a remote machine learning model to determine a first pose datum as a function of the first image. This first pose datum may be transmitted back to the local computing device, which may use first image and first pose datum as training data to train a local machine learning model. This local machine learning model may subsequently be used to estimate a pose of a user without needing to transfer data to the remote computing device and/or run remote machine learning model. In some embodiments, local machine learning model may have fewer parameters than remote machine learning model. In some embodiments, one or more machine learning models may be determined by fine-tuning a pre-trained neural network. In some embodiments, a neural network may be fine-tuned using low rank adaptation. In some embodiments, a digital model may be used to generate training data.

Figure 1:
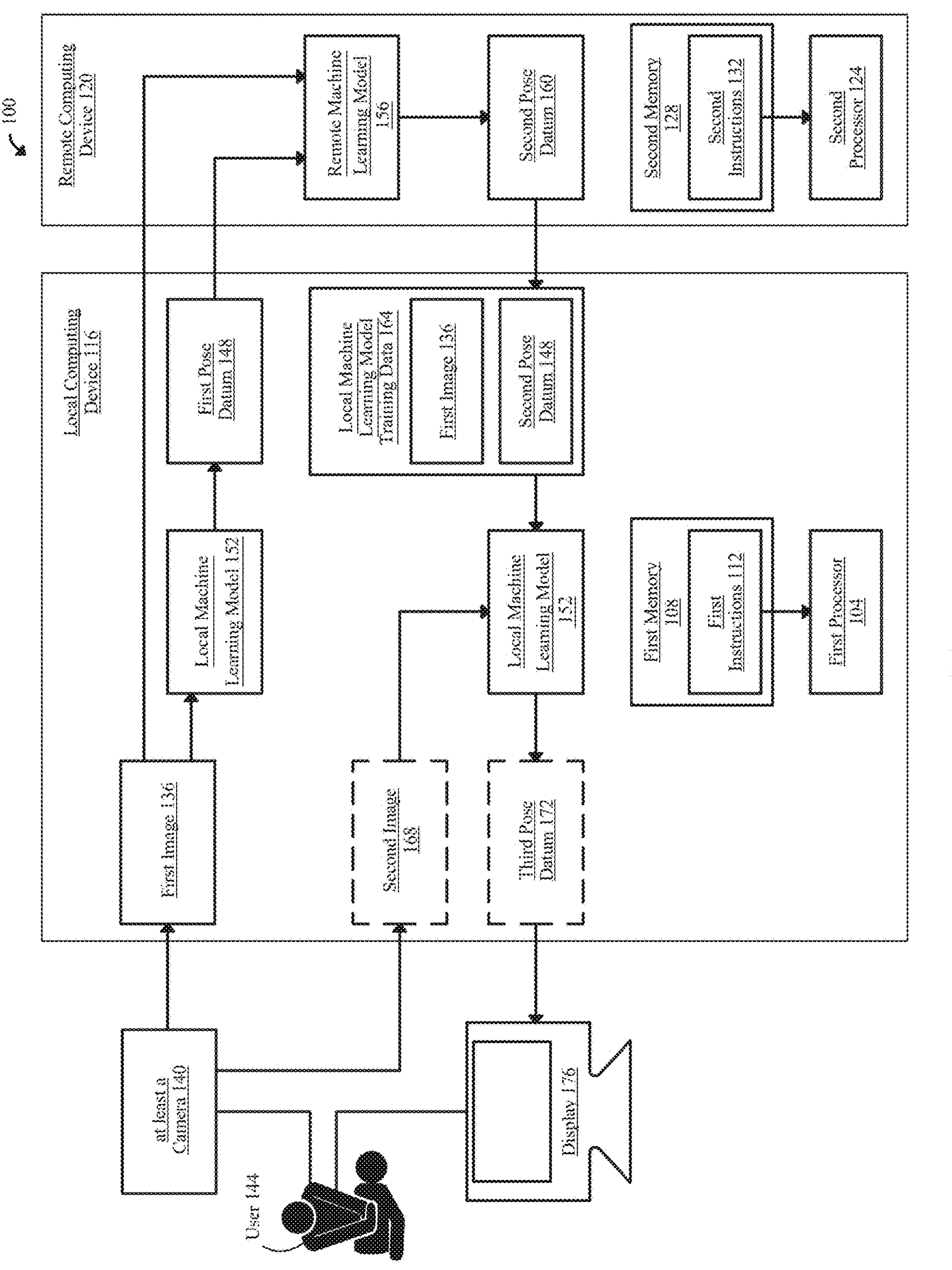
FIG. 1 is a diagram depicting an exemplary embodiment of a system for collaborative training of a machine learning model for pose estimation.

Referring now to FIG. 1, an exemplary embodiment of a system 100 for collaborative training of a machine learning model for pose estimation is illustrated. System 100 may include a computing device. System 100 may include a processor. Processor may include, without limitation, any processor described in this disclosure. Processor may be included in computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

Still referring to FIG. 1, in some embodiments, system 100 may include first at least a processor 104 and first memory 108 communicatively connected to the first at least a processor 104, first memory 108 containing first instructions 112 configuring first at least a processor 104 to perform one or more processes described herein. In some embodiments, system 100 may include a local computing device 116. As used herein, a "local computing device" is a computing device which operates a local machine learning model. Local machine learning model is described below. As an example, local computing device 116 may include a computing device which trains a local machine learning model. As another example, local computing device 116 may include a computing device which inputs a first datum into a local machine learning model and receives from the model an output. In some embodiments, local computing device 116 may be geographically local to a user, camera, and/or display. Local computing device 116 may include first processor 104 and/or first memory 108. Local computing device 116 may be configured to perform one or more processes described herein.

Still referring to FIG. 1, local computing device 116 may include but is not limited to, for example, a computing device or cluster of computing devices in a first location and a second computing device or cluster of computing devices in a second location. Local computing device 116 may include one or more computing devices dedicated to data storage, security, distribution of traffic for load balancing, and the like. Local computing device 116 may distribute one or more computing tasks as described below across a plurality of computing devices of computing device, which may operate in parallel, in series, redundantly, or in any other manner used for distribution of tasks or memory between computing devices. Local computing device 116 may be implemented, as a non-limiting example, using a "shared nothing" architecture.

Still referring to FIG. 1, local computing device 116 may be designed and/or configured to perform any method, method step, or sequence of method steps in any embodiment described in this disclosure, in any order and with any degree of repetition. For instance, local computing device 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Local computing device 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 may include remote computing device 120. Remote computing device 120 may include second at least a processor 124 and second memory 128 communicatively connected to the second at least a processor 124, second memory 128 containing second instructions 132 configuring second at least a processor 124 to perform one or more processes described herein. In some embodiments, system 100 may include a remote computing device 120. As used herein, a "remote computing device" is a computing device which operates a remote machine learning model. Remote machine learning model is described below. As an example, remote computing device 120 may include a computing device which trains a remote machine learning model. As another example, remote computing device 120 may include a computing device which inputs a first datum into a remote machine learning model and receives from the model an output. In some embodiments, remote computing device 120 may be geographically remote to a user, camera, and/or display.

Still referring to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, local computing device 116 is configured to receive a first image 136. In some embodiments, system 100 may be configured to capture first image 136 using at least a camera 140. First image 136 may include an image of user 144. First image 136 may include a digital image. In some embodiments, first image 136 may depict user 144 performing a medical procedure. Medical procedures may include, without limitation, the Heimlich maneuver, seizure protocols, basic life support (BLS), advanced cardiovascular life support (ACLS), EpiPen administration, phlebotomy procedures, pediatric advanced life support (PALS), tracheotomy procedures, tourniquet procedures, putting on a sling, rapid physical exam, psycho motor exam, putting on a splint, immobilization on a longboard, immobilization on a Kendrick extrication device and the like. In some embodiments, a medical procedure may include cardiopulmonary resuscitation (CPR). A users may include, in non-limiting examples, a user imaged by at least a camera 140, a user operating local computing device 116, a user operating remote computing device 120, a user viewing a display, a user performing a procedure such as a medical procedure, and a user instructing another user performing a procedure.

Still referring to FIG. 1, in some embodiments, at least a camera 140 may include a set of one or more devices configured to detect electromagnetic radiation. At least a camera 140 may detect, in non-limiting examples, visible light, infrared light, and ultraviolet light. At least a camera may generate a representation of detected electromagnetic radiation, such as an image. In some cases, a camera may include one or more optics. Non-limiting examples of optics include spherical lenses, aspherical lenses, reflectors, polarizers, filters, windows, aperture stops, and the like. At least a camera 140 may include, in non-limiting examples, charge-coupled device (CCD) sensors, complimentary metal-oxide-semiconductor (CMOS) sensors, chemical image sensors, and analog image sensors, such as film. In some embodiments, at least a camera 140 is configured to capture video.

Still referring to FIG. 1, in some embodiments, local computing device 116 may determine first pose datum 148. As used herein, a "pose datum" is a data structure describing a position of a body part of a subject. Such a subject may include, in non-limiting examples, a human, dog, cat, or other animal. In some embodiments, a pose datum may describe a position of a body part of a human relative to another body part of the human. In some embodiments, a pose datum may describe a position of a body part of a human relative to an object other than the human. For example, first image 136 may depict a user performing a medical procedure such as CPR on a training dummy, and a pose datum determined from first image 136 may describe a position of a body part of a human relative to a feature of such a training dummy. In some embodiments, a pose datum may describe a position of a body part of a human in absolute terms. In some embodiments, a pose datum may describe a position of a body part of a subject in 2 dimensions (such as in the plane of an image). In some embodiments, a pose datum may describe a position of a body part of a subject in 3 dimensions.

Still referring to FIG. 1, in some embodiments, local computing device 116 may determine first pose datum 148 using local machine learning model 152. Local machine learning model 152 may be trained using a supervised learning algorithm. In some embodiments, local machine learning model 152 may include a pre-trained neural network. In some embodiments, local machine learning model 152 may be fine-tuned as described below. In some embodiments, local machine learning model 152 may be trained on a training dataset including example images, associated with example pose data. Such a training dataset may be obtained, for example, using remote machine learning model 156 as described below. In additional examples, a training dataset may be obtained using a digital model and/or by capturing images and/or video of humans performing poses and detecting pose data to associate with such images through use of a sensor such as a gyroscope, accelerometer, and/or magnetometer as in a motion capture suit. Local machine learning model may be used to determine first pose datum 148. System 100 may input first image 136 into local machine learning model 152, and system 100 may receive first pose datum 148 from the model. In some embodiments, example pose data and/or pose datum 148 may include key point annotations, contours, bounding boxes, and the like.

Still referring to FIG. 1, in some embodiments, local machine learning model 152 includes a neural network. In some embodiments, local machine learning model 152 includes a deep neural network. In some embodiments, local machine learning model 152 is determined by identifying a pre-trained neural network and training a rank decomposition matrix set associated with a layer of the pre-trained neural network. As used herein, a "rank decomposition matrix set" is a plurality of matrices of values which are used to determine modifications to parameters of a layer of a neural network, where the number of trainable values of the plurality of matrices is less than the number of parameters of the layer of the neural network. In some embodiments, a rank decomposition matrix set may be used to train and/or modify a neural network, such as a pre-trained neural network.

Still referring to FIG. 1, in some embodiments, a pre-trained neural network may be fine-tuned. In some embodiments, a fine-tuning process may include freezing a pre-trained weight matrix ($W_0$) of a layer of a pre-trained model and determining an accumulated gradient update ($\Delta W$) of the layer during adaptation of the pre-trained weight matrix. $W_0$ may be a matrix with $W_0 \in R^{d \times k}$. $\Delta W$ may be a matrix with the same dimensions as $W_0$. When running the neural network, a forward pass (h) of a layer may be determined using the formula $h=W_0X+\Delta WX$ where X is the input from a previous layer. In some embodiments, a plurality of layers of a neural network may be fine-tuned. Fine-tuning a pre-trained neural network may improve efficiency, accuracy, and/or speed of neural network training. In a non-limiting example, a neural network trained on a broad variety of data may be fine-tuned for a specific purpose. In a non-limiting example, a neural network trained to estimate a pose may be fine-tuned to estimate a pose of a human performing CPR.

Still referring to FIG. 1, in some embodiments, a pre-trained neural network may be fine-tuned using low rank adaptation. In low rank adaptation, $\Delta W$ is replaced by low rank decomposition matrices A and B, using the formula $\Delta W=BA$. B and A may be matrices with $B \in R^{d \times r}$, and $A \in R^{r \times k}$. Hyperparameter r may represent the rank of a low rank adaptation module and may be chosen such that $r<\min(d,k)$ based on factors described below. A forward pass of a layer trained using low rank adaptation may have the formula $h=W_0X+BAX$. A random Gaussian initialization may be used to determine initial values for A and initial values of B may be set to 0, such that $\Delta W=BA$ is 0 before training. $\Delta WX$ may be scaled by $\alpha/r$ during training, where $\alpha$ is a constant in r. In some embodiments, a may be tuned as one would tune a learning rate. In some embodiments, a may be set and not tuned further. In some embodiments, a plurality of layers of a neural network may be fine-tuned using low rank adaptation. Fine-tuning a pre-trained neural network using low-rank adaptation may reduce memory and/or processing power requirements of fine-tuning the neural network, as B and A have fewer trainable parameters than $\Delta W$ would have in a non-low rank adaptation approach. In some embodiments, this difference may lead to substantial improvements where $\Delta W$ has very large dimensions.

The value of hyperparameter r may influence the degree to which low rank adaptation reduces memory and/or processing power requirements. In some embodiments, setting r too low may result in information loss. In some embodiments, setting r too high may result in increased memory and processing power usage for fine-tuning the neural network relative to a lower r. In some embodiments, r may be a number of linearly independent rows or columns of $\Delta W$.

Still referring to FIG. 1, in some embodiments, a pre-trained pose estimation model may be used as a starting point for training a pose estimation model described herein, such as local machine learning model 152. Low rank adaptation may be used to fine tune such a model on data specific to a particular category of pose estimation tasks, such as precisely estimating poses of certain medical procedures, such as CPR. This increase in efficiency can translate to, for example, savings in an amount of power used in model training, and/or an increase in speed of model training in comparison to conventional approaches.

Still referring to FIG. 1, in some embodiments, a single pre-trained model may be fine-tuned to create models specialized in pose estimation for different tasks. This may be done using a plurality of sets of low rank adaptation rank decomposition matrices. In a non-limiting example, a model pre-trained to estimate poses generally may be fine-tuned to create a first model specialized for pose estimation of images of humans performing CPR to a subject and/or training dummy and may also be fine-tuned to create a second model specialized for pose estimation of images of humans applying a sling to a subject and/or training dummy. This may allow re-use of $W_0$ of the pre-trained model, which may save on memory in comparison to use of different pre-trained models. This memory efficiency may be particularly impactful when combined with low rank adaptation, as low rank adaptation may be used to reduce the size of each $\Delta W$ for a plurality of fine-tuned models.

Still referring to FIG. 1, in some embodiments, adapter layers may be used to train a neural network. For example, a bottleneck adapter module may be used in which new layers including new parameters are added to a model. In some embodiments, such a modification may be made to a top layer of a deep neural network. In some embodiments, adapter layers may be used to re-purpose a pre-trained neural network. In some embodiments, weights of an original neural network may be unchanged. In some embodiments, weights of adapter layers may be initialized at random and/or trained on a downstream task.

Still referring to FIG. 1, in some embodiments, system 100 may transmit first image 136 and/or first pose datum 148 to remote computing device 120. Remote computing device 120 may be configured to receive first image 136 and/or first pose datum 148 from local computing device 116. Remote computing device 120 may be configured to determine second pose datum 160 as a function of first image 136. Remote computing device 120 may be configured to input first image 136 and/or first pose datum 148 into remote machine learning model 156 and receive from remote machine learning model 156 second pose datum 160. Remote computing device 120 may be configured to transmit to local computing device 116 second pose datum 160.

Still referring to FIG. 1, in some embodiments, remote computing device 120 may generate second pose datum 160 using remote machine learning model 156. Remote machine learning model 156 may be trained using a supervised learning algorithm. Remote machine learning model 156 may be trained on a training dataset including example images, associated with example pose data. Such a training dataset may be obtained, for example, using a digital model as described below. In another example, such a training dataset may be obtained by capturing images and/or video of humans performing poses and detecting pose data to associate with such images through use of a sensor such as a gyroscope, accelerometer, and/or magnetometer as in a motion capture suit. Once remote machine learning model 156 is trained, it may be used to determine second pose datum 160. System 100 may input first image 136 and first pose datum 148 into remote machine learning model 156, and system 100 may receive second pose datum 160 from the model. In some embodiments, remote machine learning model 156 may have a functionality of refining first pose datum 148. In some embodiments, a pose datum described herein may include key point annotations, contours, bounding boxes, and the like.

Still referring to FIG. 1, in some embodiments, remote machine learning model 156 includes a neural network. In some embodiments, remote machine learning model 156 includes a deep neural network. In some embodiments, remote machine learning model 156 is determined by identifying a pre-trained neural network and training a rank decomposition matrix set associated with a layer of the pre-trained neural network. As used herein, a "rank decomposition matrix set" is a plurality of matrices of values which are used to determine modifications to parameters of a layer of a neural network, where the number of trainable values of the plurality of matrices is less than the number of parameters of the layer of the neural network. In some embodiments, a rank decomposition matrix set may be used to train and/or modify a neural network, such as a pre-trained neural network.

Still referring to FIG. 1, in some embodiments, remote machine learning model 156 may include a neural network. In some embodiments, training remote machine learning model 156 may include receiving a pre-trained neural network; and training a rank decomposition matrix set associated with a layer of the pre-trained neural network. For example, remote machine learning model 156 may be fine-tuned using low rank adaptation. Fine tuning of neural networks is described above.

Still referring to FIG. 1, in some embodiments, remote machine learning model 156 may be trained using more resources (such as more instances of training data, or more processing power) than local machine learning model 152. In some embodiments, remote machine learning model 156 may have a more complex model architecture, such as more layers and/or more nodes per layer of a neural network, than local machine learning model 152.

Still referring to FIG. 1, in some embodiments, training remote machine learning model 156 may include creating a digital model of a human performing a pose, capturing an image as a function of the digital model, identifying a pose datum as a function of the digital model, and training remote machine learning model 156 on a training dataset including such image as an input correlated to such pose datum as an output. In some embodiments, a digital model of a human performing a pose may include a 3-dimensional model. In some embodiments, multiple images to be used in training data may be captured of a 3-dimensional model from different perspectives relative to the model. In some embodiments, digital model of a human performing a pose may include an animated model. In some embodiments, multiple images to be used in training data may be captured of an animated model at varying times in an animated sequence. In some embodiments, a digital model may include a photorealistic digital model.

Still referring to FIG. 1, in some embodiments, system 100 may determine a pose datum such as second pose datum 160 using machine vision. System 100 may include at least a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image.

Still referring to FIG. 1, in some embodiments, system 100 may include a machine vision system. In some embodiments, a machine vision system may include at least a camera. A machine vision system may use images, such as images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, an exemplary machine vision camera is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

Still referring to FIG. 1, in some embodiments, first pose datum 148 and/or second pose datum 160 may include data related to, without limitation, one or more steps of CPR. First pose datum 148 and/or second pose datum 160 may include, but is not limited to, hand orientations. "Hand orientations" as used in this disclosure are positioning of hands. Hand orientations may include positioning of an individual's hand relative to a second hand of the individual. For instance, and without limitation, a left hand may be placed on a right hand, and vice versa. Hand orientations may include finger orientations. For instance, and without limitation, finger orientations may include positioning of an individual's fingers relative to one or more other fingers of the individual. As a non-limiting example, fingers of a left hand of an individual may be positioned within spaces between fingers on a right hand of the individual. In some embodiments, hand orientations may include an angle of a wrist bend. For instance, and without limitation, an angle of a wrist bend may include an angle of 30 degrees clockwise. Hand orientations may include hand poses, such as, but not limited to, crossed fingers, open palm, two finger extensions, and the like. Hand poses may correlate to varying CPR procedures. For example, and without limitation, CPR of an adult may require a two-handed pose, CPR of a child may require a single hand pose, and CPR of an infant may include a two-finger pose.

Still referring to FIG. 1, in some embodiments, first pose datum 148 and/or second pose datum 160 may include hand placements. "Hand placements" as used in this disclosure are positioning of hands on a surface of an object and/or entity. Hand placements may include positioning of an individual's hands on top a chest of another individual, object, and the like. For instance, and without limitation, a hand positioning may include an alignment of hands on a sternum of a chest of an individual and/or mannequin. Hand placements may include measurements such as, but not limited to, inches, centimeters, millimeters, and the like. Hand placements may include coordinates along an x axis, y axis, and/or z axis. As a non-limiting example, a hand placement may include a palm of an individual's hand aligned 2 inches to the right of a sternum of an individual and/or mannequin.

Still referring to FIG. 1, in some embodiments, first pose datum 148 and/or second pose datum 160 may include arm orientations. An "arm orientation" as used in this disclosure is a positioning of an upper limb of an entity. An arm orientation may include positioning of an individual's arm. For instance, and without limitation, a left arm of an individual may be crossed over a right arm of an individual, and vice versa. In some embodiments, arm orientation may include a positioning of an individual's arm relative to their chest. For instance, and without limitation, an arm orientation may include an angle of 45 degrees between a pair of arms of an individual and a chest of the individual. Arm orientation may include elbow positioning. Elbow positioning may include a position of an individual's elbows relative to their arm. In some embodiments, elbow positioning may include a degree of bend. For instance, and without limitation, a degree of bend of an elbow may include 15 degrees between a bicep and forearm of an individual.

Still referring to FIG. 1, in some embodiments, first pose datum 148 and/or second pose datum 160 may include chest compression data. "Chest compression data" as used in this disclosure is information describing a position of a body part of an individual performing a chest compression, an individual or mannequin receiving a chest compression, or both. Chest compression data may include chest compression force. Chest compression force may be measured in newtons, pounds, grams, and the like. Chest compression force may include a force applied to an individual and/or mannequin receiving CPR. For instance, and without limitation, chest compression force may include 60 lbs of force applied to an individual's chest. In some embodiments, chest compression data may include chest compression depth. Chest compression depth may include a displacement of a chest of an individual. For instance, and without limitation, chest compression depth may include 1.5 inches downwards from a resting point of a chest. In some embodiments, chest compression data may include chest compression frequency. Chest compression frequency may include a quantity of chest compressions given divided by a unit of time. For instance, and without limitation, chest compression frequency may include a frequency of 1.6 chest compressions per second. In some embodiments, chest compression data may include chest compression pressure. Chest compression pressure may include an amount of force applied over an area of a chest. Chest compression pressure may be measured in pascals, pounds per square inch, and the like. For instance, and without limitation, chest compression pressure may include 100 lbs of force per square inch. In some embodiments, chest compression data may include a quantity of chest compressions. A quantity of chest compressions may include a sum total of chest compressions given over a period of time. For instance, and without limitation, chest compression quantity may include 200 chest compressions. In some embodiments, chest compression data may include a chest compression rate. A chest compression rate may include a quantity and/or number of chest compressions per unit of time. For instance, and without limitation, a chest compression rate may include a rate of 2 chest compressions per second.

Still referring to FIG. 1, in some embodiments, first pose datum 148 and/or second pose datum 160 may include respiratory data. Respiratory data may include information pertaining to lung functions of an individual. Respiratory data may include a quantity of breaths administered, such as, but not limited to, during mouth-to-mouth resuscitation. A quantity of breaths administered may include a sum total of breaths administered over a period of time. For instance, and without limitation, a quantity of breaths administered may include 2 breaths a minute. Respiratory data may include breath pressure, such as 1-15 psi.

Still referring to FIG. 1, in some embodiments, first pose datum 148 and/or second pose datum 160 may include data related to, without limitation, one or more steps of putting a sling on a subject such as a mannequin. In some embodiments, putting a sling on a subject involves keeping a limb of a subject immobile without aggravating other injuries. In a non-limiting example, first pose datum 148 and/or second pose datum 160 may include data on whether a knot is positioned correctly. In a non-limiting example, first pose datum 148 and/or second pose datum 160 may include data on whether a swath is positioned correctly, such as positioned such that the subject is kept immobile. In a non-limiting example, first pose datum 148 and/or second pose datum 160 may include data on whether the sling has the appropriate degree of tension.

Still referring to FIG. 1, in some embodiments, first pose datum 148 and/or second pose datum 160 may include data related to, without limitation, one or more steps of splinting a subject such as a mannequin. In some embodiments, splinting a subject involves keeping a body part of a subject immobile without aggravating other injuries.

Still referring to FIG. 1, in some embodiments, first pose datum 148 and/or second pose datum 160 may include data related to, without limitation, one or more steps of a rapid physical exam. In some embodiments, a rapid physical exam involves examining a subject for injuries. In a non-limiting example, first pose datum 148 and/or second pose datum 160 may include whether a user palpated certain areas, checked for injuries such as burns, bruises, cuts, and swelling, and/or whether a user checked for whether a subject is in pain. In some embodiments, audio of a rapid physical exam may be recorded and a speech recognition process and/or a language model, both described below, may be used to interpret user speech; first pose datum 148 and/or second pose datum 160 may include data on whether a user asked a subject whether the subject is in pain and/or attempted to get the attention of the subject.

Still referring to FIG. 1, in some embodiments, first pose datum 148 and/or second pose datum 160 may include data related to, without limitation, one or more steps of a psycho motor exam. In some embodiments, a psycho motor exam may include an examination of whether a subject's senses and/or motor functions are working correctly, such as by touching a finger and asking the subject which finger is being touched. In a non-limiting example, audio of a psycho motor exam may be recorded, a speech recognition process and/or a language model may be used to interpret user speech, and first pose datum 148 and/or second pose datum 160 may be determined, where first pose datum 148 and/or second pose datum 160 may include data on whether a user sufficiently checked for sensory and motor functions.

Still referring to FIG. 1, in some embodiments, first pose datum 148 and/or second pose datum 160 may include data related to, without limitation, one or more steps of immobilizing a subject such as a mannequin on a longboard. In some embodiments, immobilization on a longboard involves immobilizing a subject in a lying down position to prevent further injury. In a non-limiting example, first pose datum 148 and/or second pose datum 160 may include whether straps are applied in the correct places, and/or whether a cervical collar and a head immobilization element are applied in the correct order.

Still referring to FIG. 1, in some embodiments, first pose datum 148 and/or second pose datum 160 may include data related to, without limitation, one or more steps of immobilizing a subject such as a mannequin using a Kendrick extrication device. In some embodiments, immobilization using a Kendrick extrication device involves immobilizing a subject in a seated position to prevent further injury. In a non-limiting example, first pose datum 148 and/or second pose datum 160 may include whether straps are applied in the correct places, and/or whether a cervical collar and a head immobilization element are applied in the correct order.

Still referring to FIG. 1, in some embodiments, first pose datum 148 and/or second pose datum 160 may include data related to medical procedure training, using a mannequin as a subject. Still referring to FIG. 1, in some embodiments, first pose datum 148 and/or second pose datum 160 may include data related to medical procedure training, using a healthy human as a subject (as in, practicing a medical procedure such as applying a sling in a low-risk environment).

Still referring to FIG. 1, in some embodiments, first pose datum 148 and/or second pose datum 160 may be used to train a machine learning model, such as local machine learning model 152 as described below, to create an output which may be used to determine data related to one or more steps of a medical procedure, such as a procedure described above. An output of local machine learning model 152 may be used to, for example, determine whether or the degree to which a medical procedure is performed correctly.

Still referring to FIG. 1, in some embodiments, first pose datum 148 and/or second pose datum 160 may include a location of a skeletal landmark. As used herein, a "skeletal landmark" is a joint of a human. Such a joint may include skeletal joints, such as an elbow, shoulder, wrist, or a joint of a finger. In some embodiments, first pose datum 148 and/or second pose datum 160 may include a wireframe map of a body of a human and/or a body part of a human.

Still referring to FIG. 1, in some embodiments, remote computing device 120 may transmit to local computing device 116 second pose datum 160 and/or local computing device 116 may receive second pose datum 160. In some embodiments, remote computing device 120 may configure local computing device 116 to retrain local machine learning model 152 as a function of the second pose datum. Local computing device 116 may retrain local machine learning model 152 as described below.

Still referring to FIG. 1, in some embodiments, system 100 may capture second image 168, such as by using at least a camera 140. In some embodiments, second image 168 may include an image of a user performing a medical procedure, such as a medical procedure described above. In some embodiments, first image 136 and second image 168 may depict the same user. In some embodiments, first image 136 and second image 168 may depict different users. In some embodiments, second image 168 may include an image of a user performing the same medical procedure which a subject of first image 136 performs when first image 136 is taken.

Still referring to FIG. 1, in some embodiments, local computing device 116 may determine local machine learning model 152. Local machine learning model 152 may include a pre-trained neural network, and may be fine-tuned as described above, such as through use of low-rank adaptation. In some embodiments, local machine learning model 152 may be fine-tuned on a dataset including example images, such as first image 136, associated with example pose data, such as second pose datum 160. Local machine learning model 152 may be trained using local machine learning model training data 164. Local machine learning model training data 164 may include first image 136 and/or second pose datum 160. In some embodiments, local computing device 116 may determine third pose datum 172 using local machine learning model 152. Local machine learning model 152 may be trained using a supervised learning algorithm. Local machine learning model 152 may be trained on a training dataset including example images, such as first image 136, associated with example pose data, such as second pose datum 160. Such a training dataset may be obtained by, for example, performing prior steps a plurality of times in order to create a training data set including first image 136 and second pose datum 160 of sufficient size. Additionally, or alternatively, a training dataset may be obtained using a digital model as described above. Once local machine learning model 152 is trained, it may be used to determine third pose datum 172. System 100 may input second image 168 into local machine learning model 152, and system 100 may receive third pose datum 172 from the model.

Still referring to FIG. 1, in some embodiments, system 100 may determine a pose quality datum. A pose quality datum may be determined as a function of third pose datum 172. As used herein, a "pose quality datum" is a data structure describing how well a human performs a particular pose. For example, a pose quality datum may describe whether a user's hands are positioned correctly during CPR. In another example, a pose quality datum may describe the degree to which a user is positioned correctly when immobilizing a subject such as a mannequin on a longboard. In some embodiments, pose quality datum may be determined as a function of a comparison between third pose datum 172 and one or more elements of pose data labelled according to the degree to which they are correct. In some embodiments, a machine learning model may be used to determine pose quality datum. In an embodiment, pose quality data may be represented as an alphanumeric score. The pose quality data may be generated by comparing the third posed datum 172 to an ideal pose of the subject. Pose quality datum may be generated for the evaluation of any pose datum associated with the subject disclosed herein. In a non-limiting example, pose quality datum may score the position and/or movement of one or more body parts of a user.

Still referring to FIG. 1, in some embodiments, system 100 may display one or more elements of data described herein to a user such as user 144. System 100 may determine a visual element and/or visual element data structure for display to a user. System 100 may display a datum to a user using display 176. As used herein, a device "displays" a datum if the device outputs the datum in a format suitable for communication to a user. For example, a device may display a datum by outputting text or an image on a screen or outputting a sound using a speaker. Data displayed to a user may include, in non-limiting examples, first image 136, first pose datum 148, second image 168, third pose datum 172, and pose quality datum. In some embodiments, a pose datum may be visualized and displayed to a user, such as with an overlay on an associated image.

Still referring to FIG. 1, in some embodiments, a visual element data structure may include a visual element. As used herein, a "visual element" is a datum that is displayed visually to a user. In some embodiments, a visual element data structure may include a rule for displaying visual element. In some embodiments, a visual element data structure may be determined as a function of second image, third pose datum, and/or pose quality datum. In some embodiments, a visual element data structure may be determined as a function of an item from the list consisting of first image 136, first pose datum 148, second image 168, third pose datum 172, and pose quality datum. In a non-limiting example, a visual element data structure may be generated such that visual element describing or highlighting second image, third pose datum, and/or pose quality datum is displayed to a user 144. In another example, a visual element may highlight an error in a pose of third pose datum 172 as a function of pose quality datum.

Still referring to FIG. 1, in some embodiments, visual element may include one or more elements of text, images, shapes, charts, particle effects, interactable features, and the like. For example, a visual element may include second image 168.

Still referring to FIG. 1, a visual element data structure may include rules governing if or when visual element is displayed. In a non-limiting example, a visual element data structure may include a rule causing a visual element describing second image, third pose datum, and/or pose quality datum to be displayed when a user selects second image, third pose datum, and/or pose quality datum using a graphical user interface (GUI).

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously.

Still referring to FIG. 1, a visual element data structure rule may apply to a single visual element or datum, or to more than one visual element or datum. A visual element data structure may categorize data into one or more categories and may apply a rule to all data in a category, to all data in an intersection of categories, or all data in a subsection of a category (such as all data in a first category and not in a second category). For example, each pose datum in a set of pose data may be displayed using the same set of rules. A visual element data structure may rank data or assign numerical values to them. For example, pose data in which errors are detected may be ranked more highly. A numerical value may, for example, measure the degree to which a first datum is associated with a category or with a second datum. A visual element data structure may apply rules based on a comparison between a ranking or numerical value and a threshold. For example, system 100 may highlight a pose datum and/or image associated with a pose datum in which an error is detected. Rankings, numerical values, categories, and the like may be used to set visual element data structure rules. Similarly, rankings, numerical values, categories, and the like may be applied to visual elements, and visual elements may be applied based on them.

Still referring to FIG. 1, in some embodiments, visual element may be interacted with. For example, visual element may include an interface, such as a button or menu. In some embodiments, visual element may be interacted with using a user device such as a smartphone.

Still referring to FIG. 1, in some embodiments, system 100 may transmit visual element data structure to a user device. In some embodiments, visual element data structure may configure a user device to display visual element. In some embodiments, visual element data structure may cause an event handler to be triggered in an application of a user device such as a web browser. In some embodiments, triggering of an event handler may cause a change in an application of a user device such as display of visual element.

Still referring to FIG. 1, in some embodiments, system 100 may transmit visual element to a display. A display may communicate visual element to user 144. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, which allow user 144 to input data into the display. Interactive elements may be configured to enable interaction between a user and a computing device. In some embodiments, a visual element data structure is determined as a function of data input by user 144 into a display.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, a pose quality data structure may include a Boolean value representing whether an error in a pose is detected. In another non-limiting example, an image data structure may include a pose datum incorporated into an image by, for example, overlaying the pose datum on image. In some embodiments, data in a data structure may be organized in a linked list, tree, array, matrix, tenser, and the like. In some embodiments, a data structure may include or be associated with one or more elements of metadata. A data structure may include one or more self-referencing data elements, which a processor may use in interpreting the data structure. In a non-limiting example, a data structure may include "<date>" and "</date>," tags, indicating that the content between the tags is a date.

Still referring to FIG. 1, a data structure may be stored in, for example, a memory or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by a processor. In a non-limiting example, a second image data structure may be read and/or input into local machine learning model 152.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

Still referring to FIG. 1, in some embodiments, system 100 may perform one or more processes described herein multiple times, on multiple images, and/or on sequential image data. For example, one or more processes described herein may be performed on one or more frames of a video file. In some embodiments, a process described herein may be performed on every frame of a video file. In some embodiments, a process described herein may be performed on a subset of frames of a video file, such as every $5^{th}$ frame. In a non-limiting example, once local machine learning model 152 is trained, a video file which depicts a user performing CPR on a mannequin, where the video file includes second image 168, may be captured, and one or more frames of such video file may be input into local machine learning model 152 in order to generate a set of pose data, with each pose datum of the set being associated with a particular frame of the video. Sequential pose data may be used to, for example, detect whether an individual depicted in such video is performing chest compressions too slowly or too quickly.

Still referring to FIG. 1, use of one or more systems or methods described herein may improve efficiency of generation of local machine learning model 152. For example, use of a pre-trained neural network may reduce the amount of training required. In another example, use of low rank adaptation may reduce the processing power and/or memory requirements of such a training process. In another example, use of outputs of remote machine learning model 156 and/or training data generated using a digital model may improve quality of training data and/or efficiency of gathering of training data. In some embodiments, local machine learning model 152 may include a model of a different form than remote machine learning model 156. For example, local machine learning model 152 may have fewer parameters than remote machine learning model 156. This may be a result of, for example, fewer layers and/or smaller dimensions of layers of local machine learning model 152. In some embodiments, use of a smaller neural network for local machine learning model 152, while training the model on outputs of remote machine learning model 156 may reduce the processing power and/or memory requirements of implementation of local machine learning model 152, while training it to mimic the output of a larger model.

Figure 2:
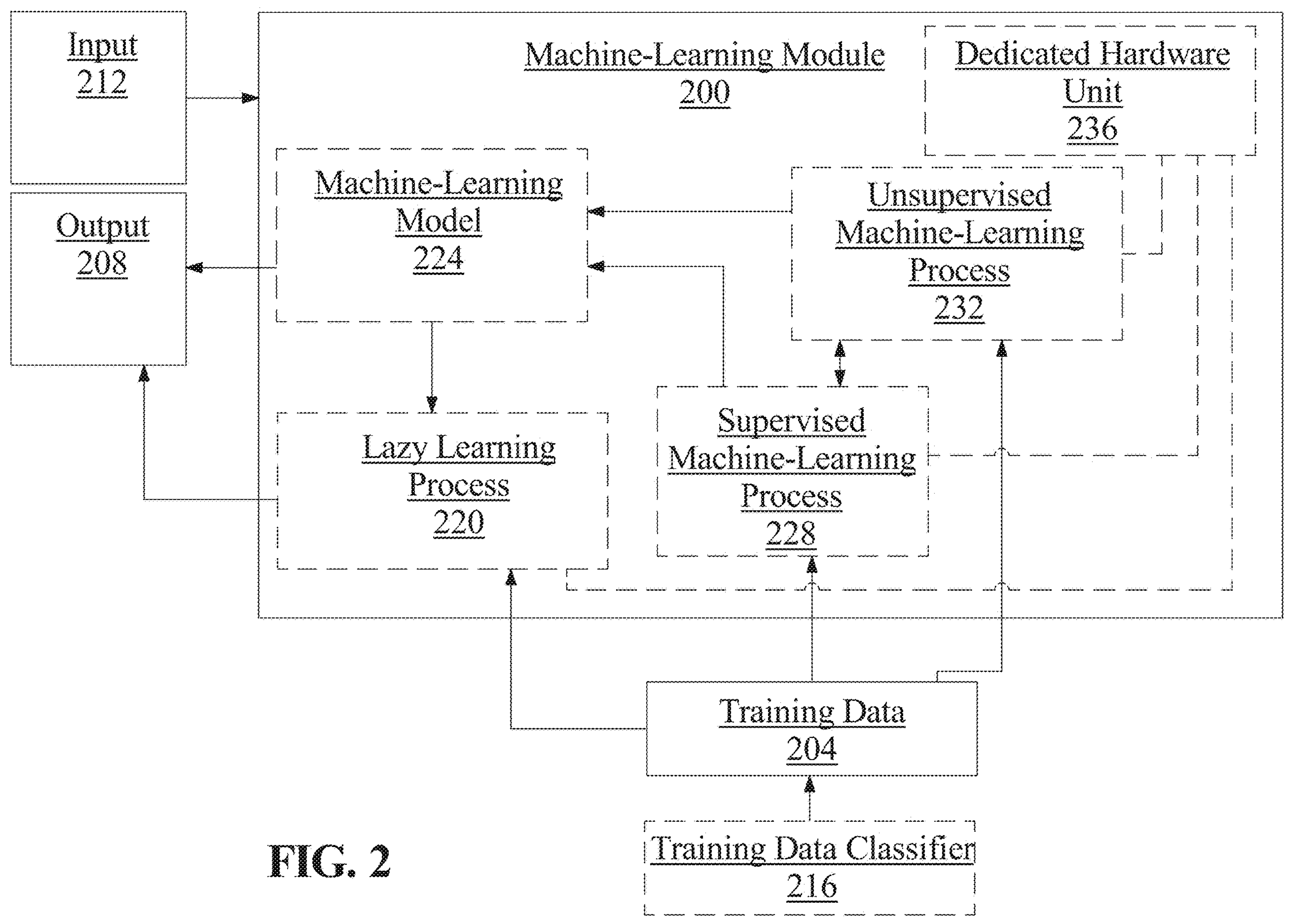
FIG. 2 is a box diagram of an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example inputs may include images and outputs may include pose data.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to classify an image to a particular stage of a medical procedure.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where α machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include images as described above as inputs, pose data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where $\alpha$ "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

With continued reference to FIG. 2, system 100 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 2, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons and used as described above. Accuracy score or another score as described above may indicate a degree of retraining needed for a machine-learning model such as a classifier; system 100 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Figure 3:
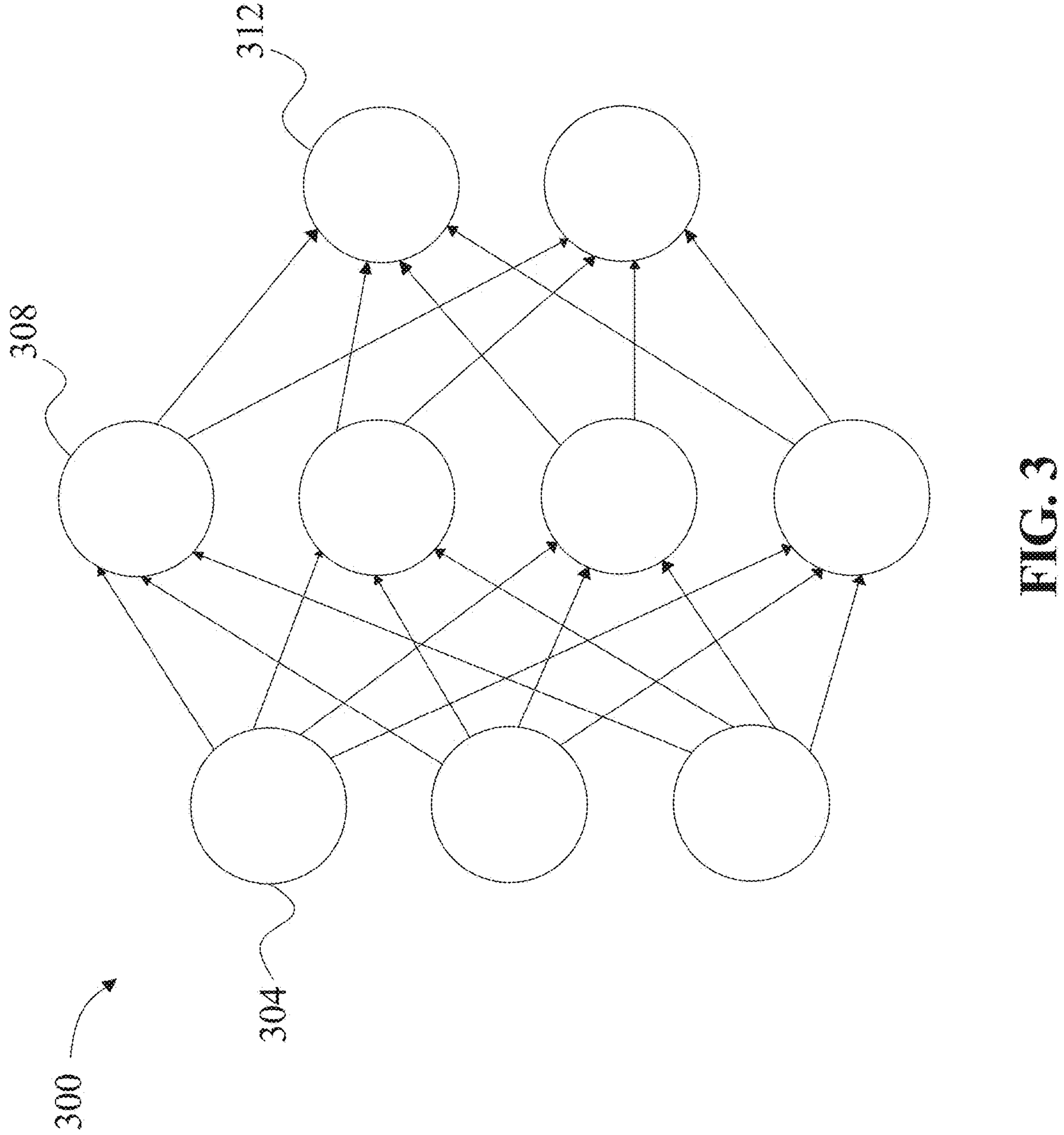
FIG. 3 is a diagram of an exemplary neural network.

Referring now to FIG. 3, an exemplary embodiment of neural network 300 is illustrated. A neural network 300, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
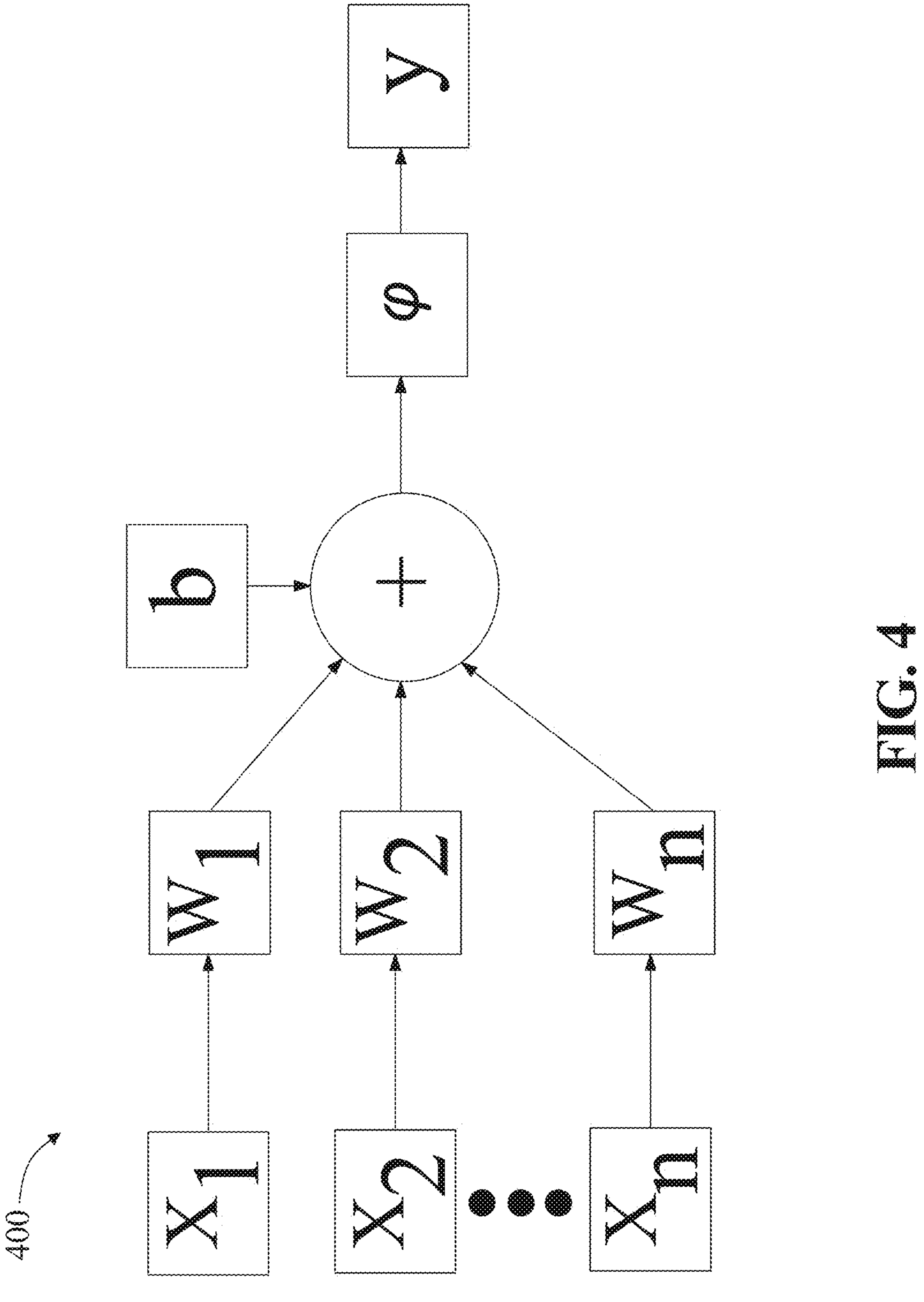
FIG. 4 is a diagram of an exemplary neural network node.

Referring now to FIG. 4, an exemplary embodiment of a node 400 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are xi, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs xi that may be used as activation functions. As a non-limiting and illustrative example, node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function p, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Still referring to FIG. 4, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where α DNN is defined as a neural network with two or more hidden layers.

Still referring to FIG. 4, in some embodiments, a convolutional neural network may learn from images. In non-limiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 5:
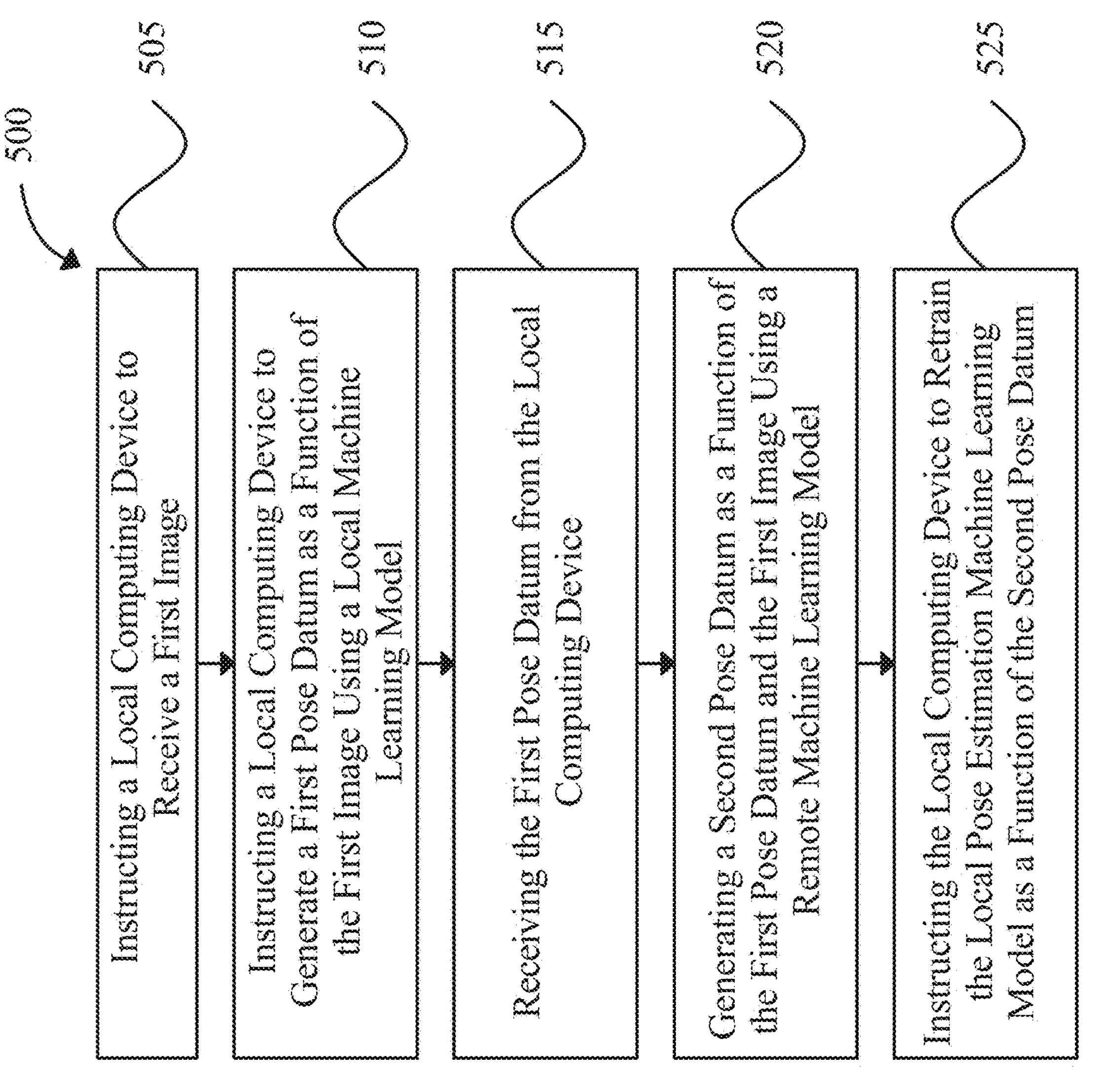
FIG. 5 is a flow diagram depicting an exemplary embodiment of a method of collaborative training of a machine learning model for pose estimation.

Referring now to FIG. 5, an exemplary embodiment of a method 500 of collaborative training of a machine learning model for pose estimation is illustrated. One or more steps if method 500 may be implemented, without limitation, as described with reference to other figures. One or more steps of method 500 may be implemented, without limitation, using at least a processor such as a processor of a local computing device.

Still referring to FIG. 5, in some embodiments, method 500 may include instructing, using a remote computing device, a local computing device to receive a first image 505. In some embodiments, the first image depicts a user performing a medical procedure.

Still referring to FIG. 5, in some embodiments, method 500 may include instructing, using a remote computing device, a local computing device to generate a first pose datum as a function of the first image using a local machine learning model 510.

Still referring to FIG. 5, in some embodiments, method 500 may include, using a remote computing device in communication with the local computing device, receiving, from the local computing device, the first pose datum 515.

Still referring to FIG. 5, in some embodiments, method 500 may include, using the remote computing device, generating a second pose datum as a function of the first pose datum and the first image using a remote machine learning model 520.

Still referring to FIG. 5, in some embodiments, method 500 may include, using the remote computing device, configuring the local computing device to retrain the local machine learning model as a function of the second pose datum 525.

Still referring to FIG. 5, in some embodiments, receiving the first image comprises, using at least a camera, capturing the first image. In some embodiments, the method further includes using the local computing device and the at least a camera, capturing a second image; using the local computing device, inputting the second image into the local machine learning model; and using the local computing device, receiving from the local machine learning model a third pose datum. In some embodiments, the method further includes, using the local computing device, determining a pose quality datum as a function of the third pose datum. In some embodiments, the method further includes, using the local computing device, displaying the pose quality datum to a user.

Still referring to FIG. 5, in some embodiments, method 500 may further include, using the remote computing device, training the remote machine learning model on a training dataset including a plurality of example images as inputs correlated to a plurality of example pose data as outputs. In some embodiments, the remote machine learning model may include creating a digital model of a subject performing a pose; capturing a third image as a function of the digital model; identifying a fourth pose datum as a function of the digital model; and retraining the remote machine learning model on a training dataset including the third image as an input correlated to the fourth pose datum as an output. In some embodiments, the remote machine learning model may include a first neural network; and training the remote machine learning model includes receiving a pre-trained neural network; and training a rank decomposition matrix set associated with a layer of the pre-trained neural network. In some embodiments, the local machine learning model includes a second neural network; and retraining the local machine learning model includes receiving a pre-trained neural network; and training a rank decomposition matrix set associated with a layer of the pre-trained neural network.

A system, apparatus or method described herein may be consistent with any system, apparatus or method disclosed in U.S. patent application Ser. No. 18/521,785, filed on Nov. 28, 2023, and titled "APPARATUS AND METHOD FOR PROCEDURAL TRAINING," and/or U.S. patent application Ser. No. 18/605,082, filed on Mar. 14, 2024, and titled "APPARATUS AND METHOD FOR AUGMENTED REALITY TRAINING" the entirety of each of which is hereby incorporated by reference.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
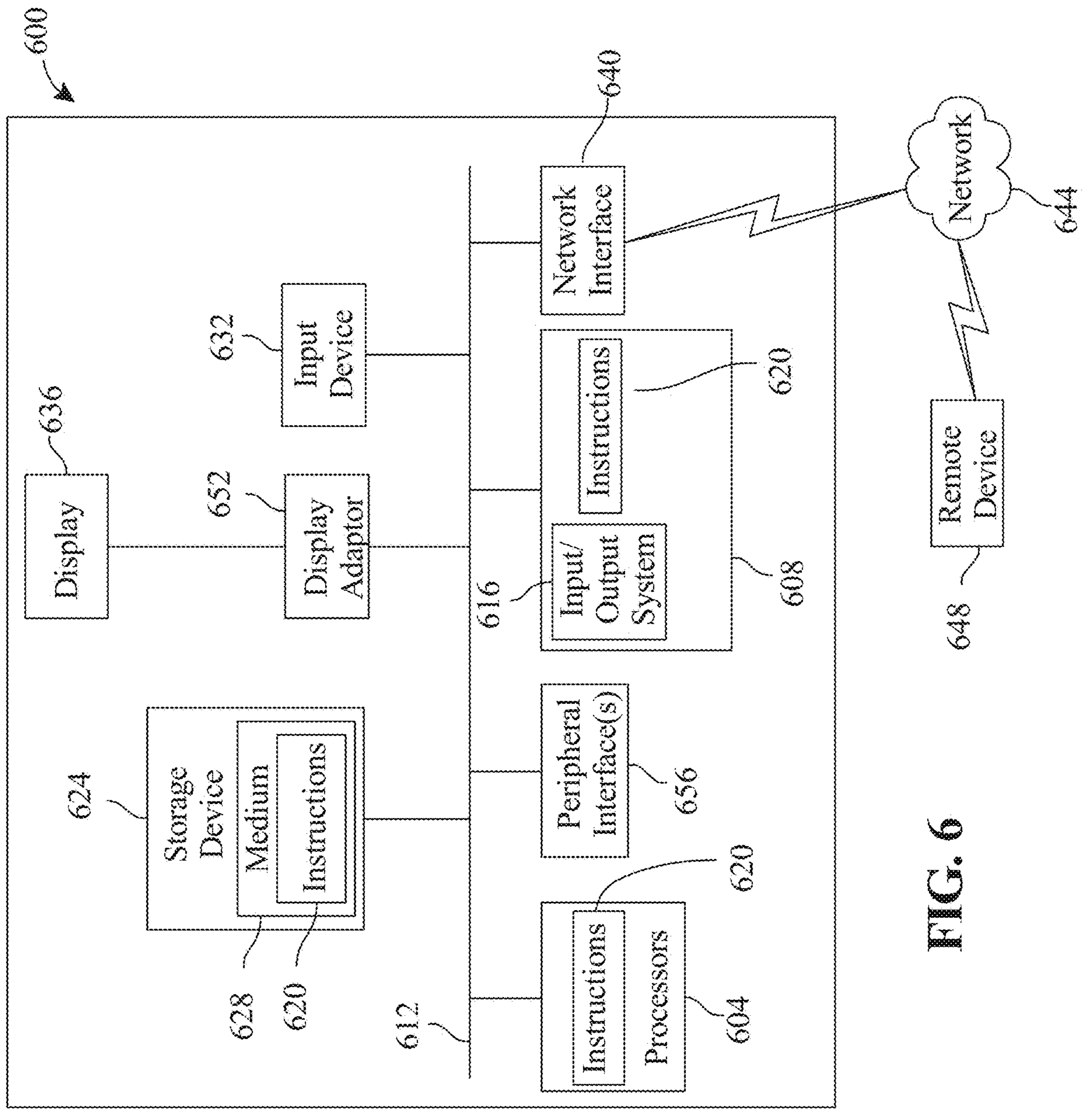
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display device 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for collaborative training of a machine learning model for pose estimation, the system comprising:

a remote computing device communicatively connected to a local computing device, wherein the remote computing device is configured to:

instruct the local computing device to:

receive a first image; and generate a first pose datum as a function of the first image using a local machine learning model; and receive, from the local computing device, the first pose datum;

generate a second pose datum as a function of the first pose datum and the first image using a remote machine learning model; and instruct the local computing device to retrain the local machine learning model as a function of the second pose datum.

2. The system of claim 1, wherein receiving the first image comprises, using at least a camera, capturing the first image.

3. The system of claim 2, wherein the remote computing device further instructs the local computing device to:

capture a second image using the at least a camera;

input the second image into the local machine learning model; and generate a third pose datum as a function of the second image using the local machine learning model.

4. The system of claim 3, wherein the remote computing device further instructs the local computing device to determine a pose quality datum as a function of the third pose datum.

5. The system of claim 4, wherein the remote computing device further instructs the local computing device to display the pose quality datum to a user.

6. The system of claim 1, wherein the remote computing device is further configured to train the remote machine learning model on a training dataset including a plurality of example images as inputs correlated to a plurality of example pose data as outputs.

7. The system of claim 6, wherein training the remote machine learning model comprises:

creating a digital model of a subject performing a pose;

capturing a third image as a function of the digital model;

identifying a fourth pose datum as a function of the digital model; and retraining the remote machine learning model on a training dataset including the third image as an input correlated to the fourth pose datum as an output.

8. The system of claim 6, wherein:

the remote machine learning model comprises a first neural network; and training the remote machine learning model comprises:

receiving a pre-trained neural network; and training a rank decomposition matrix set associated with a layer of the pre-trained neural network.

9. The system of claim 1, wherein:

the local machine learning model comprises a second neural network; and retraining the local machine learning model comprises:

receiving a pre-trained neural network; and training a rank decomposition matrix set associated with a layer of the pre-trained neural network.

10. The system of claim 1, wherein the first image depicts a user performing a medical procedure.

11. A method of collaborative training of a machine learning model for pose estimation, the method comprising:

instructing, using a remote computing device, a local computing device to:

receive a first image; and generate a first pose datum as a function of the first image using a local machine learning model; and receiving, using the remote computing device, the first pose datum from the local computing device;

generating, using the remote computing device, a second pose datum as a function of the first pose datum and the first image using a remote machine learning model; and instructing, using the remote computing device, the local computing device to retrain the local machine learning model as a function of the second pose datum.

12. The method of claim 11, wherein receiving the first image comprises, using at least a camera, capturing the first image.

13. The method of claim 12, wherein the method further comprises:

instructing, using the remote computing device, the local computing device to capture a second image using the at least a camera;

instructing, using the remote computing device, the local computing device to input the second image into the local machine learning model; and instructing, using the remote computing device, the local computing device to generate a third pose datum as a function of the second image using the local machine learning model.

14. The method of claim 13, wherein the method further comprises instructing, using the remote computing device, the local computing device to determine a pose quality datum as a function of the third pose datum.

15. The method of claim 14, wherein the method further comprises instructing, using the remote computing device, the local computing device to display the pose quality datum to a user.

16. The method of claim 11, wherein the method further comprises, using the remote computing device, training the remote machine learning model on a training dataset including a plurality of example images as inputs correlated to a plurality of example pose data as outputs.

17. The method of claim 16, wherein training the remote machine learning model comprises:

creating a digital model of a subject performing a pose;

capturing a third image as a function of the digital model;

identifying a fourth pose datum as a function of the digital model; and retraining the remote machine learning model on a training dataset including the third image as an input correlated to the fourth pose datum as an output.

18. The method of claim 16, wherein:

the remote machine learning model comprises a first neural network; and training the remote machine learning model comprises:

receiving a pre-trained neural network; and training a rank decomposition matrix set associated with a layer of the pre-trained neural network.

19. The method of claim 11, wherein:

the local machine learning model comprises a second neural network; and retraining the local machine learning model comprises:

receiving a pre-trained neural network; and training a rank decomposition matrix set associated with a layer of the pre-trained neural network.

20. The method of claim 11, wherein the first image depicts a user performing a medical procedure.

* * * * *